US012700081B2

(12) United States Patent
Ohya et al.

(10) Patent No.: US 12,700,081 B2
(45) Date of Patent: Aug. 4, 2026

(54) CONTROL METHOD FOR CONTROLLING SYSTEM AND SYSTEM

(71) Applicant: CANON KABUSHIKI KAISHA, Tokyo (JP)

(72) Inventors: Takeru Ohya, Tokyo (JP); Satoru Shingai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 17/533,907

(22) Filed: Nov. 23, 2021

(65) Prior Publication Data

US 2022/0084182 A1 Mar. 17, 2022

Related U.S. Application Data

(63) Continuation of application No. PCT/JP2020/020449, filed on May 25, 2020.

(30) Foreign Application Priority Data

May 30, 2019 (JP) ................................. 2019-101750

(51) Int. Cl.
*H04N 23/73* (2023.01)
*B25J 9/16* (2006.01)
(Continued)

(52) U.S. Cl.
CPC .............. *G06T 7/001* (2013.01); *B25J 9/1697* (2013.01); *G05B 13/0265* (2013.01); *G06T 1/20* (2013.01);
(Continued)

(58) Field of Classification Search
CPC . G06T 7/001; G06T 1/20; G06T 2207/10144; G06T 2207/20081;
(Continued)

(56) References Cited

U.S. PATENT DOCUMENTS

| | | | |
|---|---|---|---|
| 9,152,845 B2 | 10/2015 | Yamada | |
| 10,559,074 B2 | 2/2020 | Harada | |

(Continued)

FOREIGN PATENT DOCUMENTS

| | | |
|---|---|---|
| JP | 2012252507 A | 12/2012 |
| JP | 2018036241 A | 3/2018 |

(Continued)

*Primary Examiner* — John W Miller
*Assistant Examiner* — Humam M Satti
(74) *Attorney, Agent, or Firm* — Canon U.S.A., Inc. IP Division

(57) ABSTRACT

A control method for controlling a system including an imaging apparatus and a processing apparatus having a learning model to which image data is input includes capturing a first workpiece using the imaging apparatus set to a first imaging condition, thereby obtaining first image data, performing machine learning on the learning model using the first image data as supervised data, obtaining second image data using the imaging apparatus set to the first imaging condition, inputting the second image data to the trained learning model and making an estimation regarding a second workpiece based on the second image data, in a case where an accuracy of the estimation is lower than a predetermined value, obtaining third image data using the imaging apparatus set to a second imaging condition different from the first imaging condition, and performing machine learning on the learning model using the third image data as the supervised data.

6 Claims, 5 Drawing Sheets

(51) Int. Cl.
*G05B 13/02* (2006.01)
*G06T 1/20* (2006.01)
*G06T 7/00* (2017.01)

(52) U.S. Cl.
CPC ... *H04N 23/73* (2023.01); *G06T 2207/10144* (2013.01); *G06T 2207/20081* (2013.01); *G06T 2207/20084* (2013.01); *G06T 2207/30164* (2013.01)

(58) Field of Classification Search
CPC . G06T 2207/20084; G06T 2207/30164; G06T 7/0004; B25J 9/1697; G05B 13/0265; G05B 2219/32193; G05B 19/41875; H04N 23/73; H04N 23/60; H04N 25/531; H04N 25/532; H04N 25/73; G01N 21/89; G01N 21/93; G06N 20/00; G06F 18/28; G06F 18/285; G06F 18/29; G06V 10/82; G06V 10/764; G06V 10/768; G06V 10/765; G06V 10/74; G06V 10/75; G06V 10/751; G06V 10/752; G06V 10/753; G06V 10/754; G06V 10/755; G06V 10/7553; G06V 10/7557; G06V 10/757; G06V 10/758; G06V 10/759; G06V 10/76; G06V 10/761; G06V 10/762; G06V 10/84; G06V 10/87
See application file for complete search history.

(56) References Cited

U.S. PATENT DOCUMENTS

| | | | | |
|---|---|---|---|---|
| 11,170,483 | B2 | 11/2021 | Harada | |
| 2002/0168099 | A1* | 11/2002 | Noy | G01N 21/95607 |
| | | | | 382/149 |
| 2005/0275728 | A1* | 12/2005 | Mirtich | G03B 7/087 |
| | | | | 348/207.99 |
| 2005/0275834 | A1* | 12/2005 | Silver | G06T 7/0006 |
| | | | | 348/125 |
| 2005/0276459 | A1* | 12/2005 | Eames | G06F 3/0485 |
| | | | | 382/141 |
| 2009/0147120 | A1* | 6/2009 | Kurane | G01N 21/89 |
| | | | | 348/311 |
| 2011/0069166 | A1* | 3/2011 | Rauscher | G06F 18/28 |
| | | | | 348/125 |
| 2013/0307977 | A1* | 11/2013 | Saporetti | G06K 7/10861 |
| | | | | 348/143 |
| 2014/0334718 | A1 | 11/2014 | Yamada | |
| 2016/0335778 | A1* | 11/2016 | Smits | H04N 23/56 |
| 2018/0211373 | A1* | 7/2018 | Stoppa | G06T 7/55 |
| 2018/0240225 | A1 | 8/2018 | Harada | |
| 2018/0343385 | A1* | 11/2018 | Mimura | H04N 23/65 |
| 2018/0348146 | A1* | 12/2018 | Ando | G01N 21/55 |
| 2019/0210159 | A1* | 7/2019 | Endoh | G01N 27/20 |
| 2019/0293409 | A1* | 9/2019 | Matsuda | G06T 7/521 |
| 2020/0126201 | A1 | 4/2020 | Harada | |
| 2020/0160498 | A1* | 5/2020 | Coker | H04N 23/73 |
| 2020/0334801 | A1* | 10/2020 | Takahashi | A61B 1/045 |
| 2021/0092280 | A1* | 3/2021 | Nishimura | G06N 3/04 |
| 2021/0289604 | A1* | 9/2021 | Ando | B60Q 1/085 |

FOREIGN PATENT DOCUMENTS

| | | | |
|---|---|---|---|
| JP | 2018097731 | A | 6/2018 |
| JP | 2018137275 | A | 8/2018 |
| JP | 2018164272 | A | 10/2018 |
| JP | 2019056591 | A | 4/2019 |

* cited by examiner

FIG.1

LEARNING PHASE

SUPERVISED DATA     *420*

L PIECES OF NON-DEFECTIVE
PRODUCT IMAGES 411

M PIECES OF FIRST
DEFECT IMAGES 412

N PIECES OF SECOND
DEFECT IMAGES 413

LEARNING
MODEL

*430*

TRAINED
MODEL

ESTIMATION PHASE

WORKPIECE
IMAGE 440

TRAINED
MODEL

DETERMINATION
RESULT 450

WORKPIECE

SHUTTER 16 ms
CAPTURED IMAGE

SHUTTER 8 ms
CAPTURED IMAGE

SHUTTER 4 ms
CAPTURED IMAGE

DEFECT

MOVING
DIRECTION

MOVING
DIRECTION

MOVING
DIRECTION

LEARNING
MODEL

TRAINED
MODEL

CONTROL METHOD FOR CONTROLLING SYSTEM AND SYSTEM

CROSS-REFERENCE TO RELATED APPLICATIONS

This application is a Continuation of International Patent Application No. PCT/JP2020/020449, filed May 25, 2020, which claims the benefit of Japanese Patent Application No. 2019-101750, filed May 30, 2019, both of which are hereby incorporated by reference herein in their entirety.

BACKGROUND OF THE INVENTION

Field of the Invention

The present invention relates to a control method for controlling a system and a system.

Background Art

A system that recognizes a product (a workpiece) produced in a factory is known. Examples of the system include an inspection system where, in the external appearance inspection of a workpiece, the presence or absence of a defect is determined by a machine based on image data acquired by the imaging apparatus, instead of visually checking the image data with human eyes. Japanese Patent Application Laid-Open No. 2018-164272 discusses an inspection system where an imaging apparatus captures a workpiece, image data obtained by the imaging apparatus is input to a processing apparatus including artificial intelligence, and the processing apparatus inspects a defect.

In a case where an inspection is performed using artificial intelligence as in the inspection system discussed in Japanese Patent Application Laid-Open No. 2018-164272, a trained model is generated. For example, in the external appearance inspection of a workpiece produced in a factory, a workpiece moving down a production line may be inspected. The workpiece, however, is moving at high speed, and therefore, if the shutter speed is too slow, the workpiece displayed in image data may be blurred. If a trained model is created based on such image data, the accuracy of the recognition of a workpiece by artificial intelligence may decrease. The accuracy of the recognition of a workpiece is, for example, the accuracy of the distinction of the presence or absence of a defect. It may also be possible that image data is obtained by increasing the shutter speed. However, this may limit an image capturing location because a predetermined amount of light is required. Japanese Patent Application Laid-Open No. 2018-164272 does not consider such a decrease in the accuracy of the recognition of a workpiece due to an imaging condition when image data for generating a trained model is obtained.

CITATION LIST

Patent Literature

PTL 1: Japanese Patent Laid-Open No. 2018-164272

SUMMARY OF THE INVENTION

According to an aspect of the present invention, a control method for controlling a system including an imaging apparatus and a processing apparatus having a learning model to which image data captured by the imaging apparatus is input, the control method includes capturing a first workpiece using the imaging apparatus set to a first imaging condition while changing a position of the first workpiece relative to the imaging apparatus, thereby obtaining first image data, performing machine learning on the learning model using the first image data as supervised data, capturing a second workpiece different from the first workpiece using the imaging apparatus set to the first imaging condition while changing a position of the second workpiece relative to the imaging apparatus, thereby obtaining second image data, inputting the second image data to the trained learning model and making an estimation regarding the second workpiece based on the second image data, in a case where an accuracy of the estimation is lower than a predetermined value, capturing a third workpiece using the imaging apparatus set to a second imaging condition different from the first imaging condition while changing a position of the third workpiece relative to the imaging apparatus, thereby obtaining third image data, and performing machine learning on the learning model using the third image data as the supervised data.

According to another aspect of the present invention, a system includes an imaging apparatus, and a processing apparatus having a learning model to which image data captured by the imaging apparatus is input, the processing apparatus configured to perform machine learning on the learning model using, as supervised data, first image data obtained by capturing a first workpiece using the imaging apparatus set to a first imaging condition while changing a position of the first workpiece relative to the imaging apparatus, input, to the trained learning model, second image data obtained by capturing a second workpiece different from the first workpiece using the imaging apparatus set to the first imaging condition while changing a position of the second workpiece relative to the imaging apparatus and make an estimation regarding the second workpiece based on the second image data, and in a case where an accuracy of the estimation is lower than a predetermined value, perform machine learning on the learning model using, as the supervised data, third image data obtained by capturing a third workpiece using the imaging apparatus set to a second imaging condition different from the first imaging condition while changing a position of the third workpiece relative to the imaging apparatus.

Further features of the present invention will become apparent from the following description of exemplary embodiments with reference to the attached drawings.

BRIEF DESCRIPTION OF THE DRAWINGS

FIG. 1 is a diagram illustrating an overview of a system.

DESCRIPTION OF THE EMBODIMENTS

Figure 2:
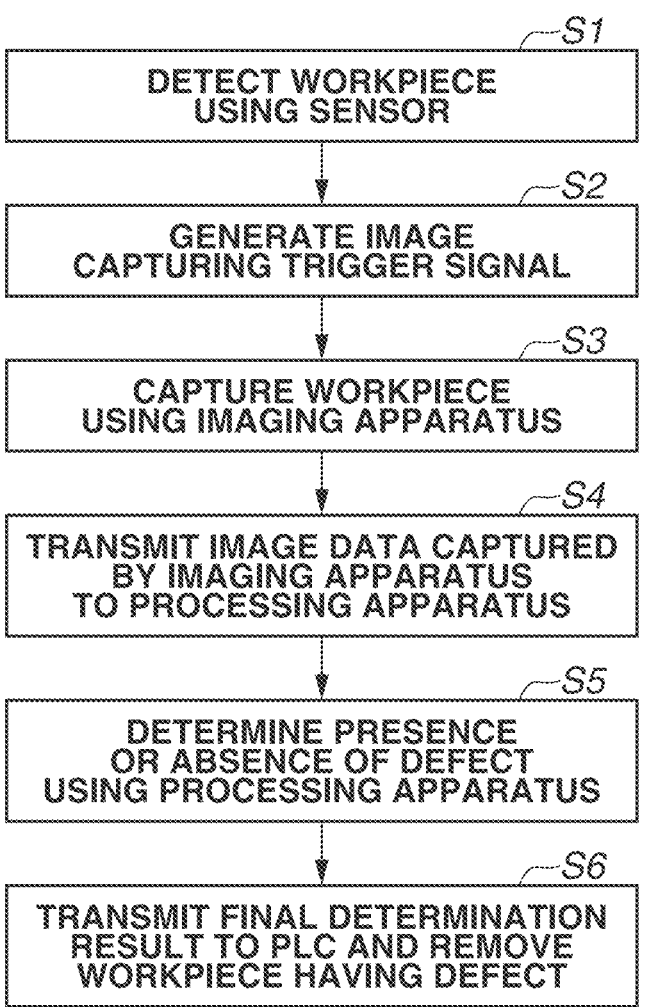
FIG. 2 is a diagram illustrating a processing flow of the system.

Exemplary embodiments illustrated below merely make the technical idea of the present invention specific, and do not limit the present invention. The sizes of and the positional relationships between members illustrated in the drawings are occasionally exaggerated to clarify the description. In the following description, similar components are designated by the same numbers and not described.

Figure 1:
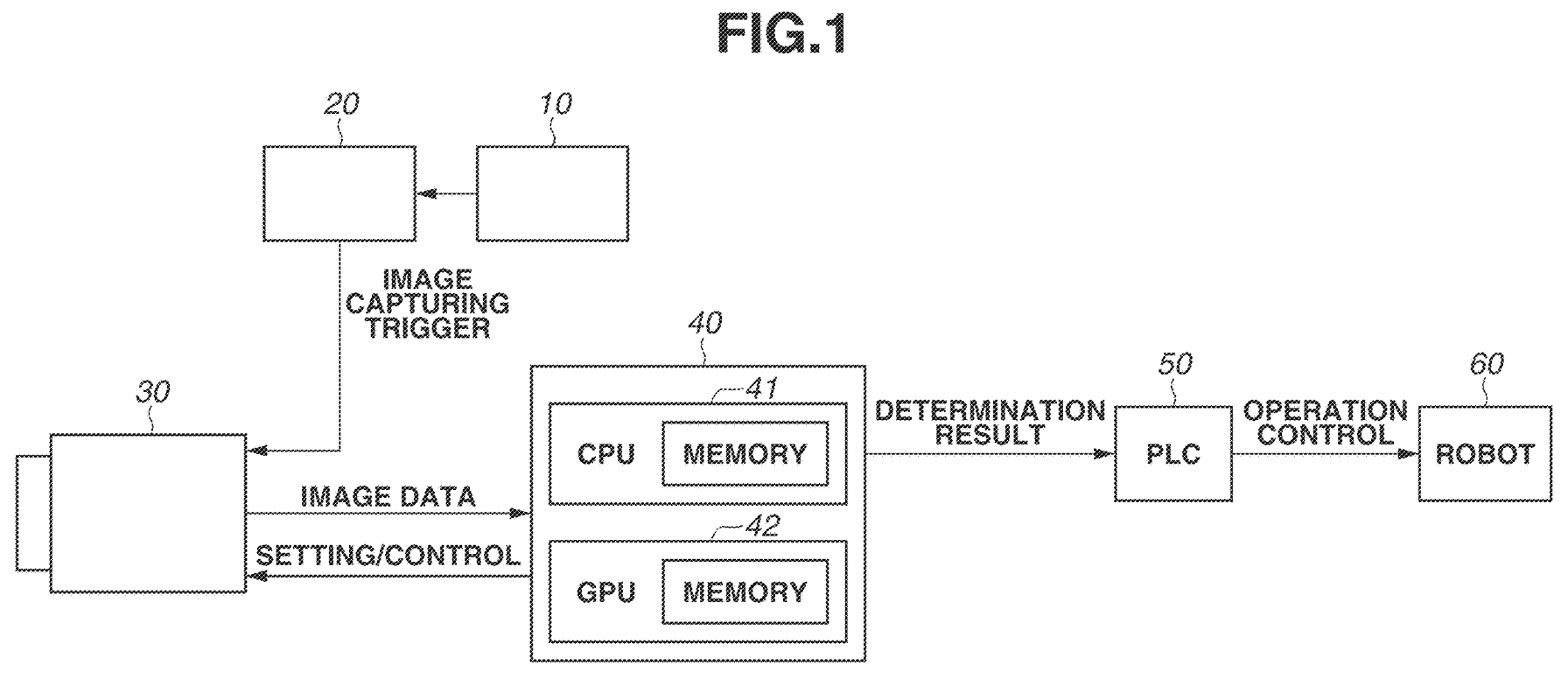

FIG. 1 illustrates the basic configuration of an inspection system as an example of a system. The system according to the present exemplary embodiment can be applied to various systems in addition to the inspection system. Examples of the various systems include a system that identifies whether a particular object is present in image data, and an automatic sorting system in a delivery center.

With reference to a processing flow illustrated in FIG. 2, the inspection system according to the present exemplary embodiment will be described below.

(Imaging Apparatus)

First, in step S1 in FIG. 2, the presence or absence of a workpiece (a target object) in a predetermined range is detected using a sensor 10. The sensor 10 is, for example, a sensor for detecting a workpiece moving at high speed on a production line. As the sensor 10, for example, an infrared sensor is used. If the sensor 10 detects a workpiece in a predetermined range, the sensor 10 outputs a signal to a trigger generation circuit 20. In step S2 in FIG. 2, the trigger generation circuit 20 generates an image capturing trigger signal based on the signal from the sensor 10.

The trigger generation circuit 20 is composed of a logic circuit such as a field-programmable gate array (FPGA) or an application-specific integrated circuit (ASIC). The trigger generation circuit 20 performs hardware processing on the signal input from the sensor 10 and transmits a trigger signal for capturing an image that is generated by the hardware processing to an imaging apparatus 30. Then, in step S3 in FIG. 2, the workpiece is captured using the imaging apparatus 30.

According to the present exemplary embodiment, the trigger generation circuit 20 is composed of a logic circuit and performs parallel processing by hardware processing. Then, a signal from the trigger generation circuit 20 is input to the imaging apparatus 30 without performing software processing. Thus, unnecessary delay is less likely to occur than in software processing in which processing is sequentially performed. It is desirable that the trigger generation circuit 20 should transmit the trigger signal to the imaging apparatus 30 by wire.

The imaging apparatus 30 includes a lens unit, an image sensor, a signal processing unit that processes a signal output from the image sensor, an output unit that outputs image data generated by the signal processing unit, and an input unit to which the trigger signal is input.

If the trigger signal is input to the input unit, the imaging apparatus 30 starts capturing an image. The lens unit is provided to be detachable from the imaging apparatus. Thus, an appropriate lens unit can be selected according to the size of the target object or the image capturing scene. The signal processing unit generates image data based on a signal output from the image sensor. The output unit outputs the image data generated by the signal processing unit.

The image sensor is an element in which photoelectric conversion units are arranged in an array, and for example, is a complementary metal-oxide-semiconductor (CMOS) sensor. The image sensor may be a rolling shutter image sensor in which an exposure period starts and ends at different times in each row, or may be a global electronic shutter image sensor in which an exposure period starts and ends at the same times in all the rows.

In the present exemplary embodiment, it is assumed that the system is used to inspect a defect in a product (a workpiece) produced on a production line. Thus, to capture a workpiece moving at high speed with higher accuracy, it is desirable to use the global electronic shutter image sensor.

(Processing Apparatus 40)

In step S4 in FIG. 2, the image data output from the imaging apparatus 30 is input to a processing apparatus 40 and estimated by the processing apparatus 40. The processing apparatus 40 makes an estimation regarding the target object in the image data. In the estimation regarding the target object in the image data, a process according to the purpose of the system is performed. A description will be given below of, as the estimation process, an external appearance inspection process for determining whether the workpiece as the image capturing target has a defect. Besides, for example, in the case of the system that identifies whether a particular object is present in image data, the identifying process corresponds to the estimation process. In the case of the automatic sorting system, the process of distinguishing a workpiece according to the size of the workpiece corresponds to the estimation process. It is desirable that the imaging apparatus 30 should transmit the image data to the processing apparatus 40 by wire.

The processing apparatus 40 has a trained model. Using the trained model, the processing apparatus 40 determines whether the workpiece has a defect. A graphics processing unit (GPU) 42 can make efficient calculations by performing parallel processing on more data. Thus, in a case where learning is performed multiple times using a learning model as in deep learning, the execution of processing by the GPU 42 is effective. In the present exemplary embodiment, the GPU 42 is used in addition to a central processing unit (CPU) 41 in the processing of the processing apparatus 40. Specifically, in a case where a learning program including a learning model is executed, the CPU 41 and the GPU 42 cooperatively make calculations, thereby performing learning. In the processing of the processing apparatus 40, only the CPU 41 or the GPU 42 may make calculations.

Each of the CPU 41 and the GPU 42 includes a memory, and the image data output from the imaging apparatus 30 is held in these memories. As described above, the trigger generation circuit 20 inputs trigger signals to the imaging apparatus 30 at the same clock time. Thus, pieces of image data at the same clock time are held in the memories of the CPU 41 and the GPU 42. The processing apparatus 40 may include a main memory different from the memory of the CPU 41 and the memory of the GPU 42. In this case, the pieces of image data are held in the main memory. Then, the pieces of image data held in the main memory are written to the memory of the CPU 41 and the memory of the GPU 42 as needed.

The GPU 42 accesses the pieces of image data held in the memories and processes the pieces of image data in parallel. Using the trained model, the GPU 42 determines whether the workpiece has a defect. The GPU 42 is more suitable for performing an enormous typical calculation process than the CPU 41 is, and the GPU 42 can quickly perform the process of determining the presence or absence of a defect based on image data of the workpiece.

In step S5 in FIG. 2, based on the image data acquired by the imaging apparatus 30, the processing apparatus 40 determines whether a defect is present in the region of the image data. The determination result of the processing apparatus 40 is output to a programmable logic controller (PLC) 50. If the final determination result indicates that the workpiece has a defect, then in step S6 in FIG. 2, the PLC 50 inputs a signal for operation control to a robot 60. The robot 60 switches the operation of moving the workpiece and moves the workpiece that has a defect according to the determination from the production line.

When the processing apparatus 40 outputs the determination result to the PLC 50, signal transmission at high speed is not required. Thus, a signal can be transferred by wire or wirelessly based on a general-purpose standard such as Ethernet.

(Trained Model 430)

Figures 3A, 3B:
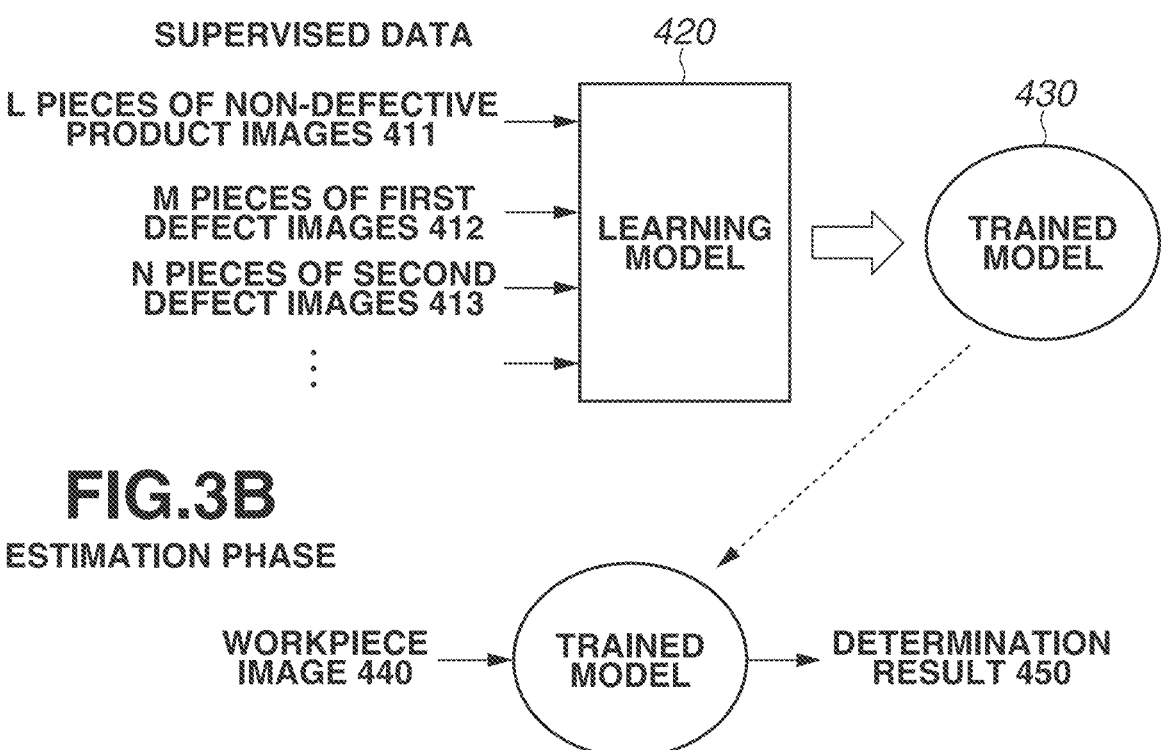
FIGS. 3A and 3B are diagrams illustrating a learning model used in the system.

FIGS. 3A and 3B are diagrams illustrating artificial intelligence (AI) that determines a defect in a workpiece in the GPU 42 of the processing apparatus 40.

FIG. 3A is a conceptual diagram of a learning phase. A learning model 420 has an algorithm for a defect determination, and supervised data is input to the learning model 420. The supervised data is pieces of image data obtained by capturing a workpiece as a non-defective product, a workpiece including a first defect, and a workpiece including a second defect different from the first defect moved down the production line. That is, as the supervised data, L pieces of non-defective product images 411, M pieces of first defect images 412, and N pieces of second defect images 413 are input. A trained model 430 is obtained by AI performing learning so that the algorithm of the learning model 420 is an algorithm with higher accuracy.

As a specific algorithm of machine learning, a nearest neighbor algorithm, a Naive Bayes algorithm, a decision tree, or a support-vector machine may be used. Alternatively, deep learning may be used in which AI itself generates a feature amount to be learned and a connection weight coefficient, using a neural network. For example, as a model for deep learning, a convolutional neural network (CNN) model may be used.

FIG. 3B is a conceptual diagram of an estimation phase. If a workpiece image 440 is input to the trained model 430 constructed in the learning phase, a determination result 450 of the presence or absence of a defect is output from the trained model 430. This process using the trained model 430 is executed by the GPU 42. Specifically, the workpiece image 440 is image data obtained by the imaging apparatus 30 capturing a workpiece moving down the production line.

Next, with reference to FIGS. 4 and 5, a method for generating trained data will be described.

As described above, workpieces used to generate supervised data are a workpiece as a non-defective product, a workpiece including the first defect, and a workpiece including the second defect, and the supervised data is pieces of image data obtained by capturing these workpieces.

Figures 4A, 4B, 4C, 4D:
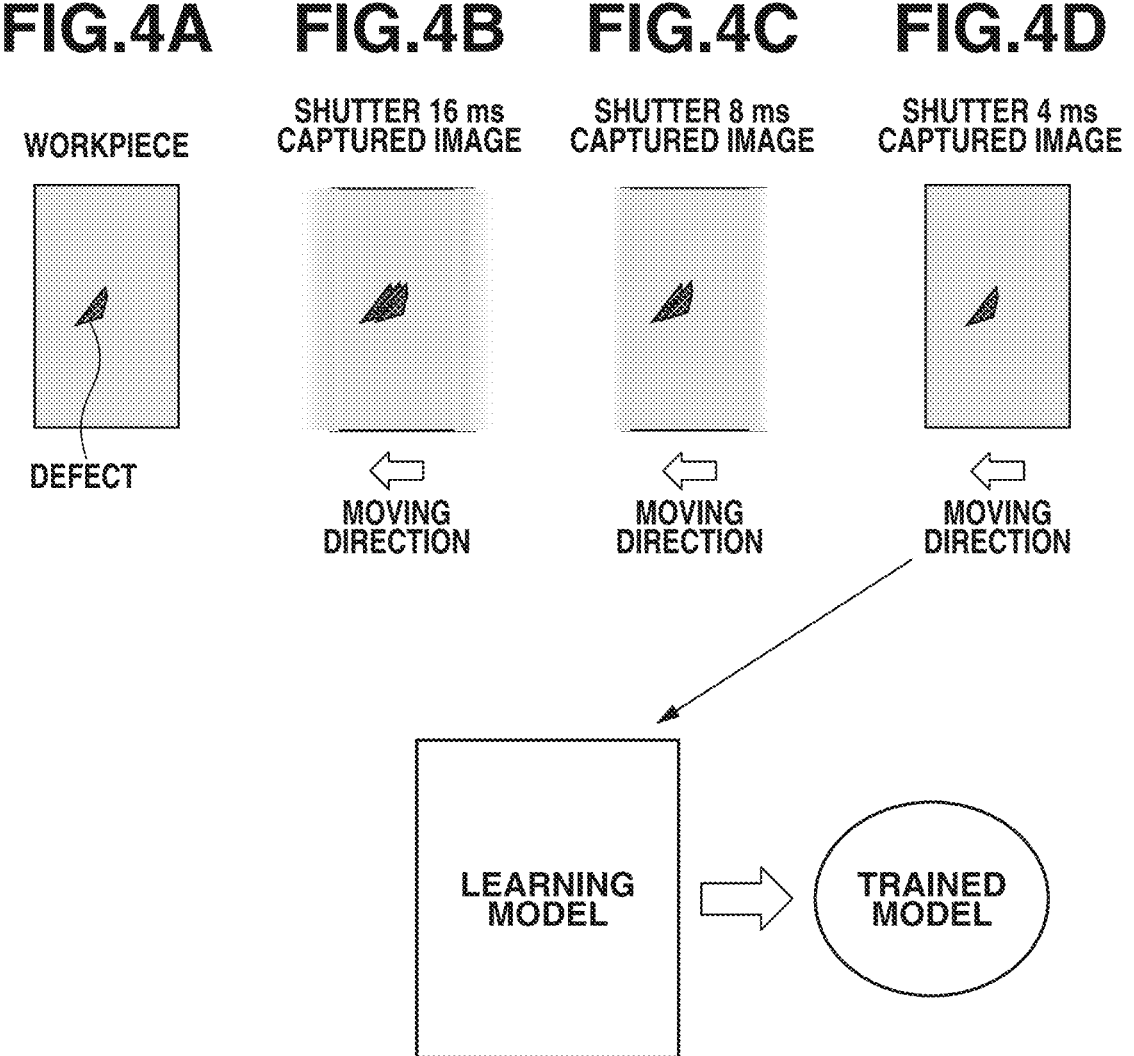
FIGS. 4A to 4D are diagrams illustrating a concept of a method for generating a trained model.

In the present exemplary embodiment, the shutter speed is changed between a first imaging condition and a second imaging condition. Specifically, the step of creating a trained model using, as the supervised data, the pieces of image data obtained by capturing the above workpieces at a certain shutter speed is repeatedly performed while changing the shutter speed until the accuracy of the estimation based on the trained model is a predetermined accuracy or higher. For example, as illustrated in FIG. 4B, if the shutter speed is too slow, a defect in a workpiece becomes blurred, and therefore, the presence or absence of a defect cannot be distinguished. Thus, even if these pieces of image data are input as a supervised model to the learning model, it is difficult to recognize the presence or absence of a defect based on a constructed trained model. If the shutter speed is too fast, then as illustrated in FIG. 4C, a defect can be determined, but the amount of light of illumination needs to be increased, and versatility decreases. For example, an image capturing location may be limited, such as a case where the system is unavailable in a case where an inspection needs to be performed in a dark place. Additionally, an amount of light greater than or equal to a certain amount is required, and therefore, expensive illumination may be required. In the present exemplary embodiment, a trained model is generated using, as the supervised data, the pieces of image data obtained by capturing these workpieces under a certain imaging condition. If the determined accuracy of the trained model is lower than a predetermined value, a trained model is generated using, as the supervised data, pieces of image data captured by changing the imaging condition. Then, the generation of a supervised data and the determination of the accuracy of the trained model using the generated supervised data are repeatedly performed until the accuracy is greater than or equal to the predetermined value. Then, a trained model the accuracy of which is greater than or equal to the predetermined value is used in the inspection system. This can heighten the accuracy of an estimation process regarding a workpiece in image data.

A method for generating the trained model 430 will be specifically described below.

Figure 5:
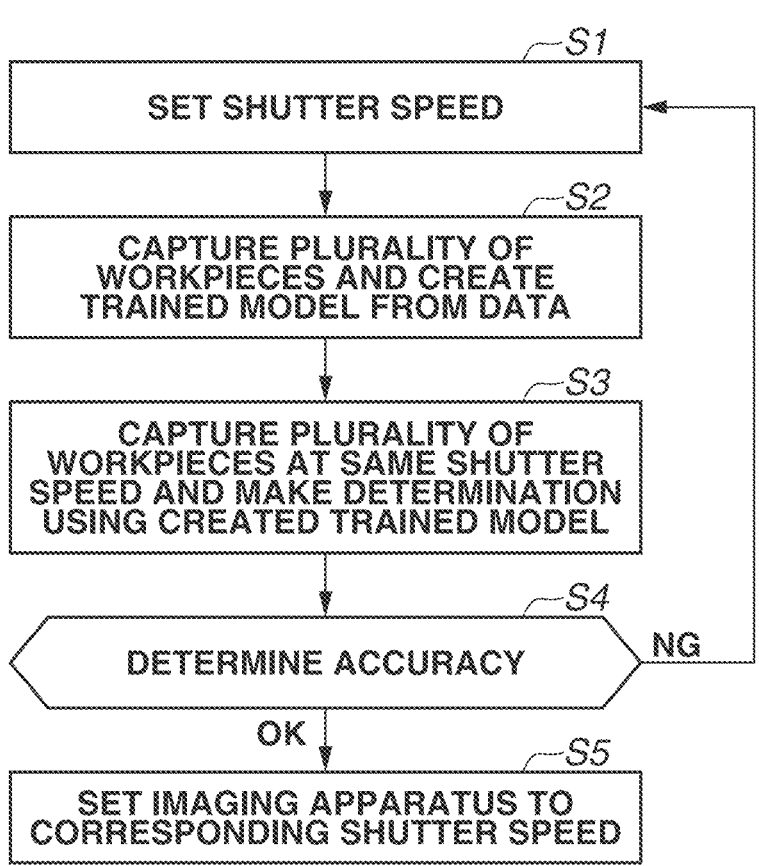
FIG. 5 is a diagram illustrating a processing flow of the method for generating a trained model.

First, in step S1 in FIG. 5, the shutter speed of the imaging apparatus 30 is set to a predetermined shutter speed (a first shutter speed). It is desirable that the first shutter speed should be as slow as possible. As described above, if the shutter speed is fast, versatility decreases. In step S4 where the accuracy of a trained model based on supervised data generated at the first shutter speed is determined, if it is determined that the accuracy is a predetermined accuracy, this may lead to excessive performance. The first shutter speed is made slow, whereby it is possible to prevent excessive performance. For example, the first shutter speed is set to 8 ms or more and 20 ms or less.

Next, in step S2 in FIG. 5, the production line on which workpieces are placed is activated, and pieces of image data are created by capturing a plurality of workpieces while changing the relative positions of the workpieces and the imaging apparatus 30, thereby creating a trained model using the pieces of image data as supervised data. At this time, as the plurality of workpieces, at least a workpiece including a defect 1 and a workpiece as a non-defective product are used. If the plurality of workpieces further includes a workpiece including a defect 2 different from the defect 1, it is possible to improve the accuracy of a quality determination.

As the supervised data, pieces of image data obtained by capturing the workpieces while changing the XY coordinates of the workpieces or pieces of image data obtained by capturing the workpieces while rotating the workpieces may be further used. These pieces of image data are input as the supervised data to the learning model, whereby it is possible to make a quality determination without decreasing the accuracy even in a case where the workpieces are shifted from predetermined positions.

Next, in step S3 in FIG. 5, a plurality of workpieces is captured using the imaging apparatus 30 set to the first shutter speed. Then, in step S4 in FIG. 5, a quality determination is made on obtained pieces of image data, thereby determining whether the accuracy of the trained model is a predetermined accuracy.

If the accuracy determined in step S4 is lower than the predetermined accuracy, the processing returns to step S1. In step S1, the shutter speed is adjusted. In a case where workpieces are captured after the processing returns to step S1, the same workpieces as or different workpieces from the workpieces captured at the first shutter speed may be used. If the accuracy determined in step S4 is the predetermined accuracy or higher, this trained model is constructed by setting the shutter speed of the imaging apparatus 30 to a corresponding shutter speed, and a recognition process on a plurality of workpieces is performed using the constructed trained model. If the accuracy determined in step S4 is lower than the predetermined accuracy, the shutter speed is changed to a second shutter speed, and steps S1 to S4 are repeatedly performed until the accuracy is the predetermined accuracy or higher.

In the present exemplary embodiment, pieces of image data captured at a shutter speed that can maintain a certain recognition accuracy are input as supervised data, thereby constructing a trained model. This can heighten the accuracy of a recognition process on a workpiece.

The first and second imaging conditions may be differentiated by changing a known condition, instead of changing the shutter speed.

Although the processing apparatus 40 generates a trained model in FIG. 1, a generated trained model may be input to the processing apparatus 40. For example, image data captured by the imaging apparatus 30 may be transmitted to an information terminal, the information terminal may generate a trained model, and a trained model having a predetermined accuracy or higher may be input to the processing apparatus 40. The information terminal is, for example, a computer such as a personal computer.

The present invention is not limited to the above exemplary embodiments, and can be changed and modified in various ways without departing from the spirit and the scope of the present invention. Thus, the following claims are appended to publicize the scope of the present invention.

Based on a control method for controlling a system and a system according to the present invention, it is possible to improve the accuracy of an estimation regarding a workpiece in image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A system comprising:
an imaging apparatus; and
a processing apparatus having a learning model to which image data captured by the imaging apparatus is input, the processing apparatus configured to:
perform machine learning on the learning model using, as supervised data, first image data obtained by capturing a first workpiece using the imaging apparatus set to a first imaging condition while changing a position of the first workpiece relative to the imaging apparatus;
input, to the trained learning model, second image data obtained by capturing a second workpiece different from the first workpiece using the imaging apparatus set to the first imaging condition while changing a position of the second workpiece relative to the imaging apparatus and make an estimation as to whether the second workpiece has a defect based on the second image data; and
in a case where an accuracy of the estimation as to whether the second workpiece has a defect is lower than a predetermined value, perform machine learning on the learning model using, as the supervised data, third image data obtained by capturing a third workpiece using the imaging apparatus set to a second imaging condition different from the first imaging condition while changing a position of the third workpiece relative to the imaging apparatus,
wherein the first and second imaging conditions are shutter speeds.

2. The system according to claim 1, wherein the shutter speed in the second imaging condition is faster than the shutter speed in the first imaging condition.

3. The system according to claim 1, further comprising:
a sensor; and
a trigger generation circuit configured to transmit an image capturing trigger signal to the imaging apparatus,
wherein, in a case where the sensor detects that the first workpiece is present in a predetermined range, the sensor outputs a signal to the trigger generation circuit, and
wherein the imaging apparatus captures the first workpiece based on the image capturing trigger signal output from the trigger generation circuit based on the signal.

4. The system according to claim 3, wherein the trained learning model outputs information indicating the estimation as to whether the second workpiece has a defect.

5. The system according to claim 4, further comprising a robot,
wherein, in a case where the estimation as to whether the second workpiece has a defect indicates that the second workpiece has a defect, the robot moves the second workpiece.

6. The system according to claim 4, further comprising a programmable logic controller (PLC) to which the information indicating the estimation as to whether the second workpiece has a defect is transmitted from the trained learning model, wherein the processing apparatus and the PLC are connected together wirelessly, and wherein the sensor and the trigger generation circuit are connected together by wire.

* * * * *